Patented Oct. 4, 1938

2,132,039

UNITED STATES PATENT OFFICE 2,132,039

PRODUCTION OF NEUTRAL SOLVENTS BY FERMENTATION

John Müller, Philadelphia, Pa., assignor to Commercial Solvents Corporation, New York, N. Y., a corporation of Maryland No Drawing. Application December 9, 1936, Serial No. 115,003

24 Claims. (Cl. 195—44)

The object of my invention is to provide an improved process for increasing the yield of solvents in the butyl alcohol fermentation of such substances as sugar, molasses, or other carbohydrate raw material which may be hydrolyzed to yield sugar. More specifically, my invention deals with improved operating conditions of wide application whereby consistently higher yields of solvents are obtained by means of organisms heretofore regarded as incapable of producing such high yields.

The organisms to which my process applies may be classed as essentially sugar fermenting rather than starch fermenting, since ordinarily they produce little, if any, fermentation in starch-containing mashes, such as for example, the corn meal mash employed in the industrial butyl-acetonic fermentation process. The essentially starch fermenting bacteria of the Clostridium acetobutylicum Weizmann type, which have been utilized in the past for the commercial production of butyl alcohol by fermentation are not in general benefited by the use of my process. Normally, final fermentation products of the essentially sugar fermenting organisms consist of high proportions of butyric and acetic acids rather than neutral solvents. However, by effecting the fermentations in accordance with my improved procedure embodying the novel operating conditions throughout the fermentations hereinafter to be described, I am able to produce final fermentation products consisting primarily of neutral solvents and only minor amounts, if any, of butyric and acetic acids.

It will be understood that any organism that is normally essentially a sugar-fermenter rather than a starch fermenter and which normally tends to produce acidic end products is within the scope of my invention. More specifically, the organisms which are included within the scope of my invention are those which are capable of producing consistently higher yields of solvents from nutrient glucose mashes than from mashes consisting solely of grain meal and water and which produce increasing amounts of acidic end products throughout the fermentation in the absence of hydrogen ion control.

My improved process comprises essentially effecting the fermentation of the sugar-containing mash in the presence of phosphate and ammonia nutrients and supplying the mash throughout the fermentation with an alkaline neutralizing agent to control the hydrogen ion concentration. If crude raw materials such as molasses are used as the source of carbohydrate for the mash, there will usually be sufficient phosphorus and a part of the necessary nitrogenous nutrient present in the original mash. In such cases it will usually be sufficient to incorporate ammonia or an ammonium compound as a supplementary nitrogen source.

I have found that a very satisfactory method of supplying the alkaline neutralizing agent consists in introducing into the original mash a non-toxic insoluble alkaline neutralizing agent such as calcium carbonate in a concentration slightly in excess of that required to neutralize any initial acidity. The presence of this insoluble material thus controls the hydrogen ion concentration secured by the action of the bacteria by supplying alkaline neutralizing material throughout the fermentation.

It can readily be demonstrated that, contrary to the results obtainable with starch fermenting bacteria of the type Clostridium acetobutylicum Weizmann, the sugar fermenting butyl alcohol producing bacteria with which my process is concerned cannot maintain the optimum hydrogen ion conditions for solvent production without the aid of alkaline neutralizing agents. In a mash in which no such materials are supplied, the acidity becomes unduly high and the yield of solvents is markedly decreased. For satisfactory solvent production with bacteria of this type the hydrogen ion concentration should be regulated throughout the fermentation such that the final hydrogen ion concentration secured by the action of the bacteria falls within the range pH 5.0–6.5. It will be obvious that any given culture of bacteria of this type will have an optimum final pH range which can readily be determined by preliminary experiments. In general it may be said that satisfactory yields may be obtained if the acidity is regulated throughout the fermentation such that the final hydrogen ion concentration secured by the action of the bacteria falls within the range pH 5.0–6.5, but that the ultimate possible yields can only be secured within a narrower final pH range for any given culture of bacteria.

As has been previously pointed out, the final hydrogen ion concentration secured by the action of the bacteria can be suitably regulated by incorporating in the initial mash a non-toxic insoluble alkaline neutralizing agent in a concentration slightly in excess of that required to neutralize any initial acidity. For example, it has been found that if calcium carbonate, or other equivalent material such as for example, barium carbonate, iron carbonate, or other water insoluble non-toxic base, is added to the mash in an amount sufficient to neutralize any free acidity, and an amount in excess of this to the extent of about 6–8% calculated on the weight of the sugar, the final pH of the fermentation will be found to fall within the operative range. Although the various materials mentioned may be satisfactorily used in this process, calcium carbonate has been found, in most cases, to be especially well suited for this purpose, and is to be preferred from an economic standpoint. However, in choosing the material to be employed, the composition of the medium should be considered, and a material chosen which will not give rise to an undesirable concentration of a particular metal ion, even though generally considered to be non-toxic in character.

The amount of calcium carbonate or other nontoxic insoluble base to be added in excess of that necessary to neutralize the free acidity of the mash will be found to vary somewhat in individual cases, but in general it may be said to be from 3.5% to 13% of the weight of the sugar in the mash. Various samples of these materials will differ in respect to the amount necessary, due to the physical properties of the material and also to its chemical properties, as for example, the presence of substantial amounts of lime. However, in any case, a preliminary fermentation will enable one skilled in the art to determine the optimum concentration for the calcium carbonate employed. It should be definitely understood that the purpose of the addition of basic materials in this process is not to neutralize all of the acids produced in the fermentation, but merely to control the hydrogen ion concentration in such a manner that the final pH secured by the action of the bacteria (and not by the action of neutralizing agents) falls within the specified limits.

It is to be understood that my invention is not to be limited to the particular means employed for securing the desired final hydrogen ion concentration. Any equivalents or modifications which would naturally occur to one skilled in the art may, of course, be employed. For example, an accurate pH control may be maintained by continuous or semi-continuous addition of a soluble alkaline material, such as ammonia, during the active stage of the fermentation and until after the "acidity break." However, the mechanical difficulties of procedures of this nature are well known to those skilled in the art. Even a slight over-neutralization at any time during the fermentation will often result in inhibiting further active fermentation for a period of many hours or even days. Consequently, automatic electrometric titration apparatus would be most desirable if such a procedure were to be employed. In any procedure of this nature, the pH should be controlled to approximate that obtained when the specified amounts of insoluble basic materials are employed. In view of the difficulties of such procedures, I prefer to secure the desired pH control by introducing materials of the insoluble type into the mash before fermentation begins.

Furthermore, from the standpoint of simplicity of operation, I prefer to control the acidity of the mash during the fermentation by means of the insoluble materials such as calcium carbonate. It has been found that for a wide range of grades of molasses, approximately 6–8% of calcium carbonate, or the like, calculated on the weight of sugar in the mash, secures adequate control of the acidity such that the final hydrogen ion concentration secured by the action of the bacteria falls within the desired limits. This fact may be seen to obviate the necessity for individual treatment of each sample of molasses unless the ultimate possible yield is desired.

With regard to the special nutrients supplied to the mash in my improved process it may be said that both phosphorus and ammonia nitrogen, or its equivalent, in the form of relatively highly degraded nitrogenous materials are essential for optimum results. As has previously been pointed out the phosphorus requirements will usually be satisfied by the phosphate content of natural raw materials utilized as sources as carbohydrate for the mash. In the event that phosphates are not supplied in this manner a small amount of ammonium, sodium, calcium, or other phosphate, may be incorporated in the mash, for example, in a concentration of about 2.5% based on the sugar content of the mash. The ammonia nitrogen may be supplied in the form of free ammonia or an ammonium salt such as ammonium sulphate, ammonium phosphate, or the like. It will be evident that ammonia is a very highly degraded form of nitrogenous nutrient and that equivalents of this material in the form of other degraded nitrogenous materials may also be employed. The amount of ammonia, or its equivalent, to be added to any given mash will, of course, vary to some extent with the raw materials used. For example, certain samples of molasses may be found to have sufficient ammonium compounds, or other degraded protein, so that very little more, or perhaps none, need be added. In general, it may be said that with cane molasses mashes from 0.5 to 1.0% of ammonia, or its equivalent, calculated on the weight of the sugar will give satisfactory results.

The following represents a typical mash prepared in accordance with the present invention: To 1000 gallons of mash, having a concentration of from 4 to 6% of sugar such as glucose, are added about 8 pounds of ammonium sulphate, about 10 pounds of ammonium, sodium, calcium, or other phosphate, and about 20 pounds of finely-divided calcium carbonate. The presence of this excess of calcium carbonate should give rise to an initial hydrogen ion concentration of the order of pH 6.2 to 5.0.

This mash is particularly adapted for fermentation with bacteria of the type herein designated as *Clostridium propyl butylicum*-alpha and the present invention may be suitably illustrated by the use of this organism. When inoculating a mash of the above type with *Clostridium propyl butylicum*-alpha and allowing fermentation to take place, solvents yields of 25% to 30%, or even higher, based on the weight of the sugar in the mash can be consistently obtained.

The *Clostridium propyl butylium*-alpha may be more accurately described by the following characteristics:

I. Morphological:
    A. Rod-shaped
    B. Spore-forming clostridia and plectridia
    C. Practically indistinguishable morphologically from members of the *Clostridium butyricum* group II. Cultural:
    A. Nutrient agar stroke; no growth aerobically or anaerobically
    B. Glucose nutrient agar slants; no growth aerobically but considerable growth anaerobically moist, raised, usually white to cream colored; higher alcohol odor changing to butyrous after exposure to air
    C. Colonies on glucose agar; substantially round, raised, usually white to cream colored; higher alcohol odor changing to butyrous after exposure to air
    D. Potato slant; moderate growth, usually white to cream colored; butyrous odor III. Biochemical:
   A. Carbohydrate fermentation:
      1. Inability to produce appreciable yields of solvents from starch as the only source of carbohydrate
      2. Inability to produce appreciable yields of solvents from sucrose as the only source of carbohydrate
      3. Inability to consistently produce yields of solvents greater than 20% calculated on the weight of sugar from uninverted molasses
      4. Ability to produce high yields of solvents from glucose or inverted molasses
      5. Ability to ferment carbohydrates as evidenced by production of acid and/or gas:

| | |
|---|---|
| Corn starch | [1]— |
| Soluble starch | — |
| Dextrin | — |
| Raffinose | — |
| Sucrose | [3]xx |
| Maltose | [4]xxx |
| Glucose | [5]xxxx |
| Laevulose | xxxx |
| Xylose | xx |
| Dulcitol | — |
| Mannitol | — |
| Glycerol | [2]x |
| Lactose | xxx |

[1] — negative.
[2] x very slight.
[3] xx moderate.
[4] xxx decided.
[5] xxxx abundant.

B. Nitrogen metabolism:
      1. Ability to produce high yields of solvents in sugar media containing ammonia as the principal source of nitrogen
      2. Ability to utilize degraded protein (including ammonia) as sole nitrogen source
      3. Inability to utilize undegraded protein as sole source of nitrogen
      4. Inability to liquefy gelatin
      5. Inability to produce more than slight proteolysis of milk
   C. Oxygen requirements:
      1. Anaerobic
   D. Temperature range for solvent production:
      1. From 25° C. to 36° C., preferably 28° C. to 32° C.
   E. Hydrogen ion concentration for solvent production:
      1. Final pH of 5.0–6.5, preferably 5.8–6.1.

The most satisfactory yields, when employing *Clostridium propyl butylicum*-alpha, are obtained from the monohexoses. The disaccharides such as sucrose or sucrose-containing materials blackstrap molasses are attacked relatively slowly and hence require inversion by the action of invertase, acid, or other means before they are suitable for fermentation on an industrial scale. From the monohexoses or invert sugars, I am able to obtain with *Clostridium propyl butylicum*-alpha by my new process yields of 25%–30% of total solvents, the composition of which being of the order of 65%–70% n-butyl alcohol, 25%–15% isopropyl alcohol, and the remainder acetone together with a small amount of ethyl alcohol.

*Clostridium propyl butylicum*-alpha is a member of the group of bacteria which has been designated *Clostridium propyl butylicum* and which comprises a relatively large group of organisms readily identified by means of the primary characteristics listed below. So much confusion exists in the nomenclature and reported cultural characteristics of the prior art organisms, particularly of the *Clostridium butyricum* type, that it is impossible to state definitely if any of them are included in the group now designated as *Clostridium propyl butylicum*. It is to be understood, therefore, that this group of organisms includes within its scope any such prior art bacteria as well as any newly isolated cultures which have, in fact, the following primary characteristics:
   I. Morphological:
      A. Rod-shaped
      B. Spore-forming-Clostridia and Plectridia
      C. Practically indistinguishable from members of the *Clostridium butyricum* group
   II. Biochemical:
      A. Carbohydrate fermentation:
         1. Inability to produce appreciable yields of butyl and isopropyl alcohols from starch as the only source of carbohydrate
         2. Inability to produce appreciable yields of butyl and isopropyl alcohols from sucrose as the only source of carbohydrate
         3. Inability to consistently produce yields of solvents greater than 20% calculated on the weight of the sugar from uninverted molasses
         4. Ability to produce high yields of butyl and isopropyl alcohols from glucose or inverted molasses
      B. Nitrogen metabolism:
         1. Ability to produce high yields of butyl and isopropyl alcohols in sugar media containing ammonia as the principal source of nitrogen
         2. Ability to utilize degraded protein (including ammonia) as sole nitrogen source
         3. Inability to utilize undegraded protein as sole source of nitrogen
         4. Inability to liquefy gelatin or to produce more than very slight proteolysis of milk
      C. Oxygen requirements:
         1. Anaerobic
      D. Temperature range for solvent production:
         1. From 25° C. to 36° C., preferably 29° C. to 31° C.
      E. Hydrogen ion concentration for solvent production:
         1. Final pH of 5.0–6.5, preferably 5.8–6.1.

The above outline is believed to be sufficient to enable one skilled in the art to identify the organisms in question. A complete characterization such as that of the descriptive chart of the Society of American Bacteriologists would not only be unnecessary, but would be confusing since different members of this group of organisms would vary in a number of minor particulars having no bearing upon the present case. All organisms having in common the above characteristics come within this group of bacteria irrespective of further properties which they may possess.

In view of the uncertainty in the literature as to methods utilized for certain of the biochemical tests referred to above, it is desirable to amplify, somewhat, the characteristics briefly outlined. For example, the fermentation characteristics referred to under the heading "Carbohydrate fermentation" are those characteristics determined under optimum conditions, as for example, in the inverted molasses medium described above or in similar media containing other carbohydrates. Quite different results may be obtained with laboratory media containing lower percentages of sugar. It should also be noted that fermentation characteristics such as these refer to normal consistent results and not to abnormally low or high results which may sometimes be obtained with any culture. A typical carbohydrate fermentation test of an organism falling in this group is given below as an illustration.

INVERTED MOLASSES MEDIUM (MEDIUM I)

Cuban molasses at about 20% sugar concentration is inverted by heating with sulphuric acid equivalent to 5% on the weight of the sugar for 40 minutes at 20 lbs. pressure. At the conclusion of the inversion, about 0.7% of ammonia on the weight of the sugar is added and subsequently sufficient finely-divided calcium carbonate is introduced to neutralize the remaining free acidity. An excess of calcium carbonate amounting to about 6% on the weight of the sugar is then introduced and the mash is diluted to a sugar concentration of about 5% and sterilized for 30 minutes at 20 lbs. pressure. It might be desirable to reduce the steam pressure and increase the time of inversion and sterilization so as to avoid caramelization of the sugar due to local overheating. In this case 2 hours at 5 lbs. pressure is roughly equivalent to 40 minutes at 20 lbs. A typical yield in this type of medium is 30%–32% of solvents calculated on the weight of the sugar in the mash.

| Medium No. | Composition percent by weight of mash | Solvent yield percent of carbohydrate |
|---|---|---|
| II | 5% corn mash | Trace. |
| III | 20% potato mash, 0.1% (NH$_4$)$_2$SO$_4$ | Trace. |
| IV | 25% potato mash, 20% yeast water, 0.6% CaCO$_3$. | 2.6 |
| V | 5.0% glucose, 0.2% (NH$_4$)$_2$SO$_4$, 0.3% (NH$_4$)$_2$HPO$_4$, 0.05% NH$_4$Cl, 0.05% MgSO$_4$, 0.6% CaCO$_3$, initial pH adjusted to 6.4. | 26.0 |
| VI | 5% sucrose, 0.1% (NH$_4$)$_2$SO$_4$, 0.15% K$_2$HPO$_4$, 0.05% MgSO$_4$, 0.5% CaCO$_3$, initial pH adjusted to 6.1. | 3.2 |
| VII | 5.0% sugar as inverted Cuban molasses, 0.04% NH$_3$ as ammonium sulfate, 0.5% CaCO$_3$. | 30.7 |
| VIII | 5.5% sugar as uninverted molasses, 0.04% NH$_3$ as ammonium sulfate, 0.5% CaCO$_3$. | 9.0 |

With regard to the nitrogen metabolism, the undegraded protein materials referred to are such materials as corn gluten and corn germ meal, the degraded protein referred to comprises such materials as yeast water, steep water, and urea, and the gelatin liquefaction refers to tests such as incubation on nutrient gelatin containing 2% glucose. For example, stab cultures on such medium were incubated at 22° C. and shake cultures were incubated at 30° C. Excellent growth was obtained in each case but at the end of 30 days the gelatin was in all cases found to be solid at 22° C. The proteolysis of milk refers to tests such as the standard litmus milk test. In litmus milk organisms of this group first reduce the litmus and then give a somewhat rennet-like acid curd which shows only slight digestion at the end of 30 days. The following example illustrates the type of test which may be made to determine the nitrogen requirements of the organisms:

| Medium No. | Composition percent by weight of mash | Solvent yield (percent calculated on sugar) |
|---|---|---|
| IX | 5.0% invert sugar, 0.15% K$_2$HPO$_4$, 0.1% (NH$_4$)$_2$SO$_4$, 0.05% MgSO$_4$, 0.5% CaCO$_3$. | 25.0 |
| X | 5.0% glucose, 0.6% CaCO$_3$ in 10% yeast water. | 34 |
| XI | 5.0% invert sugar, 0.15% K$_2$HPO$_4$, 0.05% MgSO$_4$, 0.3% corn germ, 0.3% corn gluten, 0.5% CaCO$_3$. | 2.0 |

It is to be noted that the utilization of ammonia is specified as the principal source of nitrogen rather than the sole source for optimum solvent production. These organisms can utilize ammonia as the sole source of nitrogen, in some cases with optimum solvent yield, but for consistent high yields of solvents it is preferred to have a small amount of some other degraded protein material present in addition to the ammonia. This additional amount, however, will usually be present in such material as molasses so that the use of ammonia alone will serve to produce optimum yields.

The term "anaerobic" as used in the above outline, refers to the inability of the organisms to grow on the surface of nutrient glucose agar when incubated aerobically. The organisms, are, however, capable of developing and producing satisfactory fermentation in deep liquid medium when incubated aerobically due to the anaerobic conditions which they maintain within the medium.

The temperature and hydrogen ion concentration ranges referred to do not represent the entire ranges within which growth will occur but represent merely the ranges within which high yields of solvents may be obtained when operating under the other conditions specified. Also, the solvent ratios which are given as characteristic of the organism are those which are normally consistently obtained under optimum conditions and do not refer to abnormal ratios which may sometimes be secured with any of the cultures. Furthermore, it is to be understood that the characteristics specified for these organisms are not to be taken as limited to the specific methods and data given above. These were given merely by way of illustration, whereas the characteristics of the organisms as claimed in the present invention are those given generally in the outline.

The organisms of this group are widely distributed in nature and may be isolated from such various sources as soil, rotted wood, grain, corn stalks, river mud, and the like. In view of the characteristics listed above, one skilled in the art may isolate these organisms from such sources by known methods of isolation. Of course, as is apparent to one skilled in the art, these organisms cannot be isolated from every sample of material tested. However, if a number of different materials are tried, a good culture will nearly always be secured. The following specific example is given as illustrative of one of the methods applicable to this purpose:

A large number of flasks, say twenty each of the following media are prepared:

| Medium No. | Composition, percent by weight of mash |
|---|---|
| I | (As described above). |
| XII | 3.0% glucose, 0.1% $(NH_4)_2SO_4$, 0.15% $(NH_4)_2HPO_4$, 0.05% $NH_4Cl$, 0.05% $MgSO_4$, 0.3% $CaCO_3$, pH adjusted to 6.0. |

These media are sterilized in the usual manner and while still hot, e. g., 80–85° C., are inoculated with samples of soil, mud, corn, corn stalks, rotted wood, and the like. The flasks are held at the inoculating temperature for a short time, e. g., 1 to 3 minutes, and are then rapidly cooled to 32° C. and incubated at this temperature. The cultures evidencing the strongest fermentation at the end of 48 hours are chosen for further investigation and are allowed to sporulate for at least 5 days at 32° C. The cultures are then transferred to flasks of Medium I while the latter is still hot, e. g., 95–100° C. After not more than one minute at this temperature, they are cooled rapidly to 32° C. and incubated at this temperature. This procedure may then be repeated a number of times to further enrich the cultures, but as a rule, at the end of the third transfer a number of cultures will show sufficient activity to warrant quantitative determination of the solvents. These cultures which show fair yields, for example yields of 15% or over, on the weight of the sugar, may then be tested on Medium I and Medium XIII (which is the same medium as Medium I, but containing uninverted molasses) or the cultures may be plated at this stage if desired. In the former case, those cultures which show good yields on Medium I and poor yields on Medium XIII are then chosen for further quantitative fermentations. If the results of these fermentations show high yields of solvents with proportions of butyl alcohol, isopropyl alcohol, ethyl alcohol, and acetone within the limits specified below, the desired cultures have probably been obtained. These may then be further purified by plating if desired.

If the cultures are plated after the first quantitative fermentation, this may be done in the usual manner utilizing such media as standard glucose-yeast water agar, standard nutrient agar containing 2.0% glucose and 0.1% $(NH_4)_2SO_4$, and the like. These plates may then be incubated anaerobically at 32° C. and after growth is evidenced, colonies may be tested quantitatively on Medium I after several 24 hour transfers on similar medium. The desired cultures may then be chosen on the basis of the quantitative results. Further plating for selection of good strains may be made if desired. Cultures of these bacteria may be stored in the usual manner in the form of spore cultures, but unless the spore cultures are stored on dried sterile soil or some highly buffered medium, they should be transferred every 10 days to Medium I containing 3–5% sugar and allowed to germinate.

It is to be understood, of course, that the above isolation procedures are illustrative only and may be varied in any manner known to those skilled in the art. Furthermore, it is to be understood that the present invention is not limited to the use of cultures isolated by this or any other method; but, as has been previously stated, it includes within its scope any previously obtained bacteria from any source which have the characteristics herein outlined.

When utilizing bacteria of this group for large scale fermentations, it is necessary to take certain precautions with regard to the inoculant in order to insure consistent high yields. The amount of inoculant used should be from 2–5% by volume, preferably 3–4%. Also the inoculant should be at least the second generation removed from the spore state and preferably the fourth to sixth generation. Of course in large scale operations this latter may readily be accomplished by the successive transfers required to build up the necessary volume of inoculant. The transfers may be made at 24 hours on medium of the type of Medium I containing 3–5% of sugar.

The products obtained in the fermentation of commercial sugar media containing about 5% sugar, e. g., a 10% inverted molasses mash, are normal butyl alcohol, isopropyl alcohol, ethyl alcohol, and acetone, the yields usually ranging from 28–32% of total solvents calculated on the weight of the sugar. The following solvent ratios are obtained:

Butyl alcohol—above 60%; usually 65–70%
Isopropyl alcohol—above 15%; usually 16–20%
Ethyl alcohol—below 10%; usually 3–4%
Acetone—below 15%; usually 5–10%

The gases given off during the fermentation consist of carbon dioxide and hydrogen in a ratio of $CO_2/H_2$ of the order of magnitude of 3/1.

The following are specific examples of fermentations employing organisms of the group *Clostridium propyl butylicum:*

Example I

Medium I containing 5% sugar was inoculated with 3% of the fourth generation of a culture obtained from rotted wood and incubated at 30–32° C. for 72 hours. The yield and solvent ratio were then determined and found to be as follows:

| Yield, percent calculated on sugar | Solvent ratio | | |
|---|---|---|---|
| | Butyl alcohol | Ethyl and isopropyl alcohol | Acetone |
| 28.8 | 66.3 | 22.9 | 10.8 |

Example II

Medium I containing 5.0% sugar is inoculated with about 3% of the fourth generation of a culture obtained from a colony in plating a culture obtained from rotted wood. The fermentation was then carried out in the usual manner at 30–32° C. The yield and solvent ratio were found to be as follows:

| Yield, percent calculated on sugar | Solvent ratio | | |
|---|---|---|---|
| | Butyl alcohol | Ethyl and isopropyl alcohol | Acetone |
| 31.1 | 68.3 | 25.8 | 5.9 |

*Example III*

Medium I containing 5% sugar was inoculated with the fourth generation of a culture obtained from a green corn stalk and the fermentation carried out in the usual manner. The following yield and solvent ratio were obtained:

| Yield, percent calculated on sugar | Solvent ratio | | |
|---|---|---|---|
| | Butyl alcohol | Ethyl and isopropyl alcohol | Acetone |
| 32.2 | 71.9 | 20.0 | 7.1 |

*Example IV*

Medium VII containing 5% corn sugar was inoculated with the fourth generation of a culture obtained from rotted wood and the fermentation carried out in the usual manner. The following yield and solvent ratio were obtained:

| Yield, percent calculated on sugar | Solvent ratio | | |
|---|---|---|---|
| | Butyl alcohol | Ethyl and isopropyl alcohol | Acetone |
| 27.3 | 75.6 | 20.8 | 3.6 |

*Example V*

Medium I containing 5% sugar was inoculated with the fourth generation of a culture obtained from rotted wood and the fermentation carried out in the usual manner. The following yield and solvent ratio were obtained:

| Yield, percent calculated on sugar | Solvent ratio | | |
|---|---|---|---|
| | Butyl alcohol | Ethyl and isopropyl alcohol | Acetone |
| 30.2 | 73.9 | 20.8 | 4.7 |

In this fermentation the pH of the mash was determined, at intervals throughout the fermentation, and at the completion of the fermentation after an elapsed time of 63 hours. The following pH values were obtained:

```
20 hours ------------------------------ 5.59
40 hours ------------------------------ 5.70
46 hours ------------------------------ 5.98
63 hours ------------------------------ 5.85
```

As further illustrating the general applicability of my process to fermentation of sugar mashes with butyl alcohol producing bacteria of the class capable of producing consistently higher yields of solvents from a nutrient glucose mash, than from a mash consisting solely of grain meal and water, and which produce increasing amounts of acidic end products throughout the fermentation in the absence of hydrogen ion control, the following examples are cited which were carried out by fellow workers to whom I had previously disclosed my process, with various specific types of such bacteria selected by them.

The same operating conditions that apply to the group *Clostridium propyl butylicum* and specifically to *Clostridium propyl butylicum*-alpha also apply to these organisms, as for example, *Clostridium inverto-aceto-butylicum*.

Bacteria designated as *Clostridium inverto-aceto-butylicum* comprises any bacteria having the following primary characteristics:

I. Morphological:
    A. Rod-shaped
    B. Spore-forming—Clostridia and Plectridia
    C. Practically indistinguishable from members of the *Clostridium butyricum* group II. Biochemical:
    A. Carbohydrate fermentation:
        1. Inability to produce appreciable yields of butyl alcohol and acetone from starch as the only source of carbohydrate
        2. Inability to produce appreciable yields of butyl alcohol and acetone from sucrose as the only source of carbohydrate
        3. Inability to consistently produce yields of solvents greater than 20% calculated on the weight of the sugar from uninverted molasses
        4. Ability to produce high yields of butyl alcohol and acetone from glucose or inverted molasses
    B. Nitrogen metabolism:
        1. Ability to produce high yields of butyl alcohol and acetone in sugar media containing ammonia as the principal source of nitrogen
        2. Ability to utilize degraded protein (including ammonia) as sole nitrogen source
        3. Inability to utilize undegraded protein as sole source of nitrogen
        4. Inability to liquefy gelatin or to produce more than very slight proteolysis of milk.
    C. Oxygen requirements:
        1. Anaerobic
    D. Temperature range for solvent production:
        1. From 25° C. to 36° C., preferably 29° C. to 31° C.
    E. Hydrogen ion concentration for solvent production:
        1. Final pH of 5.0–6.5, preferably 5.7–6.1

The following specific example illustrates the use of the above organism in my process:

*Example VI*

Medium I containing 5% sugar was inoculated with 2.5 of a culture of *Clostridium inverto-aceto-butylicum* obtained from a rotted corn stalk and incubated at 31° C. for 68 hours. The yield and solvent ratio were found to be as follows:

| Yield, percent on sugar | Solvent ratio | | |
|---|---|---|---|
| | Butyl alcohol | Acetone | Ethyl alcohol |
| 28.8 | 70.3 | 24.2 | 5.5 |

My process has likewise been satisfactorily applied to improving the yields produced by bacteria of the group *Clostridium saccharo-acetobutylicum*. Bacteria of this group comprise any bacteria having the following primary characteristics:

I. Morphological:
    A. Rod-shaped
    B. Spore-forming—Clostridia and Plectridia
    C. Practically indistinguishable from members of the *Clostridium butyricum* group II. Biochemical:
    A. Carbohydrate fermentation:
        1. Ability to produce fair yields of butyl alcohol and acetone consistently from starch as the only source of carbohydrate (i. e., corn or other mash containing starch and suitable nutrients)
        2. Ability to produce yields of butyl alcohol and acetone consistently above 30% on the weight of the sugar from 5% sucrose media or an uninverted molasses medium of the character of Medium I described above except for the fact that it contains uninverted instead of inverted sugar
        3. Ability to produce yields of butyl alcohol and acetone consistently above 30% on the weight of the sugar from 5% glucose media with suitable nutrients, or on inverted molasses medium corresponding to Medium I hereinbefore described
    B. Nitrogen metabolism:
        1. Ability to produce high yields of butyl alcohol and acetone in sugar media containing ammonia as the principal source of nitrogen
        2. Ability to utilize degraded protein (including ammonia) as the sole source of nitrogen
        3. Inability to utilize undegraded protein as the sole source of nitrogen
        4. Inability to liquefy gelatin or to produce more than slight proteolysis of milk
    C. Oxygen requirements:
        1. Anaerobic
    D. Temperature range for solvent production:
        1. From 24° C. to 40° C., preferably 29° C. to 30° C.
    E. Hydrogen ion concentration for solvent production:
        1. Final pH of 5.0–6.2, preferably 5.4–5.85.

The following specific example illustrates the use of the above organism in my process:

*Example VII*

A mash similar in composition to Medium I but containing 5.5% uninverted sucrose in place of inverted sucrose, was inoculated with 4% of a sixth generation culture of a member of the group *Clostridium saccharoacetobutylicum* and incubated at 30° C. for 68 hours. The yield and solvent ratio were found to be as follows:

| Yield, percent on sugar | Solvent ratio | | |
|---|---|---|---|
| | Butyl alcohol | Acetone | Ethyl alcohol |
| 38.0 | 69.6 | 27.5 | 2.9 |

It is to be understood, of course, that my invention is not limited in its application to any of the particular cultures specified above by way of illustration. In general, it may be said that my improved process is applicable to all butyl alcohol producing bacteria of the class which are capable of producing consistently higher yields of solvents from nutrient glucose mashes than from mashes consisting solely of grain meal and water, and which produce increasing amounts of acidic end products throughout the fermentation in the absence of hydrogen ion control, but which produce final fermantation products consisting primarily of neutral solvents when the fermentation is effected in the presence of phosphates, degraded protein nitrogen, such as ammonia, and the acidity is regulated throughout the fermentation whereby the final hydrogen ion concentration secured by the action of the bacteria falls within the range pH 5.0 to 6.5. By the term nutrient glucose mashes, in this connection, is meant mashes such as Media V, X, and XII above.

It will, of course, be evident to one skilled in the art that all cultures of butyl alcohol producing bacteria will not ferment different types of sugars to the same degree, and that my process could not enable a particular culture of bacteria to ferment an otherwise unfermentable sugar. It may be said, however, that my process will make possible consistently higher yields of solvents from a readily fermentable sugar than can be obtained without its application. It should be understood therefore that my invention is applicable to any type of sugar mash if the particular bacteria employed have the necessary enzymes to convert the sugar to solvents. In general, it may be said that equivalents and modifications of procedure which would naturally occur to one skilled in the art, may be employed without departing from the scope of this invention.

This application is a continuation-in-part of my application Ser. No. 650,036, filed January 3, 1933, which in turn, is a continuation-in-part of my application Ser. No. 534,140, filed April 30, 1931.

The invention now having been described what I claim is:

1. In a process for the production of butyl alcohol by subjecting a fermentable sugar mash to the action of a culture of butyl alcohol producing bacteria of the class which are capable of producing consistently higher yields of solvents from a nutrient glucose mash than from a mash consisting solely of grain meal and water and which produce increasing amounts of acidic end products throughout the fermentation in the absence of hydrogen ion control, the improvement to increase the yield of neutral solvents which comprises providing phosphate and ammonia nutrients in the mash, and also supplying non-toxic alkaline neutralizing agents to the mash throughout the fermentation to control the acidity thereof, whereby the final hydrogen ion concentration secured by the action of the bacteria falls within the optimum range for solvent production.

2. In a process for the production of butyl alcohol by subjecting a fermentable sugar mash to the action of a culture of butyl alcohol producing bacteria of the class which are capable of producing consistently higher yields of solvents from a nutrient glucose mash than from a mash consisting solely of grain meal and water and which produce increasing amounts of acidic end products throughout the fermentation in the absence of hydrogen ion control, the improvement to increase the yield of neutral solvents which comprises providing phosphate and ammonia nutrients in the mash, and also supplying non-toxic alkaline neutralizing agents to the mash throughout the fermentation to control the acidity thereof, whereby the final hydrogen ion concentration secured by the action of the bacteria falls within the range pH 5.0 to pH 6.5.

3. In a process for the production of butyl alcohol by subjecting a fermentable sugar mash to the action of a culture of butyl alcohol producing bacteria of the class which are capable of producing consistently higher yields of solvents from a nutrient glucose mash than from a mash consisting solely of grain meal and water and which produce increasing amounts of acidic end products throughout the fermentation in the absence of hydrogen ion control, the improvement to increase the yield of neutral solvents which comprises providing phosphate and ammonia nutrients in the mash, and also supplying substantially water insoluble non-toxic alkaline neutralizing agents to the mash throughout the fermentation to control the acidity thereof, whereby the final hydrogen ion concentration secured by the action of bacteria falls within the range pH 5.0 to pH 6.5.

4. In a process for the production of butyl alcohol by subjecting a fermentable sugar mash to the action of a culture of butyl alcohol producing bacteria of the class which are capable of producing consistently higher yields of solvents from a nutrient glucose mash than from a mash consisting solely of grain meal and water and which produce increasing amounts of acidic end products throughout the fermentation in the absence of hydrogen ion control, the improvement to increase the yield of neutral solvents which comprises increasing the yield of neutral solvents by providing phosphate and ammonia nutrients in the mash, and also supplying calcium carbonate to the mash throughout the fermentation to control the acidity thereof, whereby the final hydrogen ion concentration secured by the action of the bacteria falls within the range pH 5.0 to pH 6.5.

5. In a process for the production of butyl alcohol by subjecting a fermentable sugar mash to the action of a culture of butyl alcohol producing bacteria of the class which are capable of producing consistently higher yields of solvents from a nutrient glucose mash than from a mash consisting solely of grain meal and water and which produce increasing amounts of acidic end products throughout the fermentation in the absence of hydrogen ion control, the improvement to increase the yield of neutral solvents which comprises providing phosphate and ammonia nutrients in the mash, and also supplying a neutralizing agent to the mash throughout the fermentation to control the acidity thereof, the said neutralizing agent being introduced into the mash in the form of calcium carbonate in a concentration slightly in excess of that required to neutralize the initial acidity of the mash.

6. In a process for the production of butyl alcohol by subjecting a fermentable sugar mash to the action of a culture of butyl alcohol producing bacteria of the class which are capable of producing consistently higher yields of solvents from a nutrient glucose mash than from a mash consisting solely of grain meal and water and which produce increasing amounts of acidic end products throughout the fermentation in the absence of hydrogen ion control, the improvement to increase the yield of neutral solvents which comprises providing phosphate and ammonia nutrients in the mash, and also supplying a neutralizing agent to the mash throughout the fermentation to control the acidity thereof, the said neutralizing agent being introduced into the mash in the form of an initial addition of calcium carbonate in a concentration of 3.5% and 13% based on the weight of the sugar in the mash in excess of that required to neutralize the initial acidity of the mash.

7. In a process for the production of butyl alcohol by subjecting a fermentable sugar mash to the action of a culture of butyl alcohol producing bacteria of the class which are capable of producing consistently higher yields of solvents from a nutrient glucose mash than from a mash consisting solely of grain meal and water and which produce increasing amounts of acidic end products throughout the fermentation in the absence of hydrogen ion control, the improvement to increase the yield of neutral solvents which comprises providing phosphate and ammonia nutrients in the mash, and also supplying a neutralizing agent to the mash throughout the fermentation to control the acidity thereof, the said neutralizing agent being introduced into the mash in the form of an initial addition of calcium carbonate in a concentration of 6% to 7% based on the weight of the sugar in the mash in excess of that required to neutralize the initial acidity of the mash.

8. A process for the production of normal butyl alcohol, isopropyl alcohol, ethyl alcohol, and acetone, which comprises subjecting a fermentable carbohydrate mash containing inverted carbohydrate, as the principal source of fermentable carbohydrate, and a nutrient material selected from the group consisting of ammonia, ammonium salts, urea, yeast water, and steep water, to the action of bacteria of the group *Clostridium propyl butylicum*, at temperatures from 25° to 36° C., while controlling the acidity of the mash during the fermentation by means of neutralizing agents chosen from the group consisting of calcium carbonate, barium carbonate, and iron carbonate, whereby the final hydrogen ion concentration secured by the action of the bacteria falls within the range pH 5.0 to pH 6.5.

9. A process for the production of normal butyl alcohol, isopropyl alcohol, ethyl alcohol, and acetone, which comprises subjecting a fermentable carbohydrate mash containing inverted molasses, as the principal fermentable carbohydrate, and an ammonium compound to the action of bacteria of the group *Clostridium propyl butylicum*, at temperatures from 28° C. to 32° C., while controlling the acidity of the mash during the fermentation whereby the final hydrogen ion concentration secured by the action of the bacteria falls within the range pH 5.8 to pH 6.1.

10. A process for the production of normal butyl alcohol, isopropyl alcohol, ethyl alcohol, and acetone, which comprises subjecting a fermentable carbohydrate mash containing inverted carbohydrate, as the principal fermentable carbohydrate, to the action of bacteria of the group *Clostridium propyl butylicum*, at temperatures from 25° C. to 36° C.

11. A process for the production of normal butyl alcohol, isopropyl alcohol, ethyl alcohol, and acetone, which comprises subjecting a fermentable carbohydrate mash containing inverted carbohydrate, as the principal fermentable carbohydrate, and degraded protein nitrogen to the action of bacteria of the group *Clostridium propyl butylicum*, at temperatures from 25° C. to 36° C., while controlling the acidity of the mash during the fermentation whereby the final hydrogen ion concentration secured by the action of the bacteria falls within the range pH 5.0 to pH 6.5.

12. In a process for the production of normal butyl alcohol, isopropyl alcohol, ethyl alcohol and acetone by the fermentation of a carbohydrate mash containing inverted carbohydrate as the principal fermentable carbohydrate, the improvement which comprises subjecting said mash in the presence of degraded protein nitrogen to the action of a culture of bacteria of the group identified as *Clostridium propyl butylicum* by means of the herein described primary characteristics, at temperatures from 25° C. to 36° C., and supplying non-toxic alkaline neutralizing agents to the mash to control the acidity thereof throughout the fermentation, whereby the final hydrogen ion concentration secured by the action of the bacteria falls within the range pH 5.0 to pH. 6.5.

13. In a process for the production of normal butyl alcohol, isopropyl alcohol, ethyl alcohol and acetone by the fermentation of a carbohydrate mash containing inverted carbohydrate as the principal fermentable carbohydrate, the improvement which comprises subjecting said mash in the presence of degraded protein nitrogen to the action of a culture of bacteria of the group identifiable as *Clostridium propyl butylicum* by means of the herein described primary characteristics, at temperatures from 25° C. to 36° C., and supplying substantially insoluble non-toxic alkaline neutralizing agents to the mash to control the acidity thereof throughout the fermentation, whereby the final hydrogen ion concentration secured by the action of the bacteria falls within the range pH 5.0 to pH 6.5.

14. In a process for the production of normal butyl alcohol, isopropyl alcohol, ethyl alcohol and acetone by the fermentation of a carbohydrate mash containing inverted carbohydrate as the principal fermentable carbohydrate, the improvement which comprises subjecting said mash in the presence of degraded protein nitrogen to the action of a culture of bacteria of the group identifiable as *Clostridium propyl butylicum* by means of the herein described primary characteristics, at temperatures from 25° C. to 36° C., and supplying calcium carbonate to the mash to control the acidity thereof throughout the fermentation, whereby the final hydrogen ion concentration secured by the action of the bacteria falls within the range pH 5.0 to pH 6.5.

15. In a process for the production of normal butyl alcohol, isopropyl alcohol, ethyl alcohol and acetone by the fermentation of a carbohydrate mash containing inverted molasses as the principal fermentable carbohydrate, the improvement which comprises subjecting said mash in the presence of degraded protein nitrogen to the action of a culture of bacteria of the group identifiable as *Clostridum propyl butylicum* by means of the herein described primary characteristics, at temperatures from 25° to 36° C., and supplying non-toxic alkaline neutralizing agents to the mash to control the acidity thereof throughout the fermentation, whereby the final hydrogen ion concentration secured by the action of the bacteria falls within the range pH 5.8 to pH 6.1.

16. In a process for the production of normal butyl alcohol, isopropyl alcohol, ethyl alcohol and acetone by the fermentation of a carbohydrate mash containing inverted molasses as the principal fermentable carbohydrate, the improvement which comprises subjecting said mash in the presence of degraded protein nitrogen to the action of a culture of bacteria of the group identifiable as *Clostridium propyl butylicum* by means of the herein described primary characteristics, at temperatures from 25° C. to 36° C., and supplying substantially insoluble nontoxic alkaline neutralizing agents to the mash to control the acidity thereof throughout the fermentation, whereby the final hydrogen ion concentration secured by the action of the bacteria falls within the range pH 5.8 to pH 6.1.

17. In a process for the production of normal butyl alcohol, isopropyl alcohol, ethyl alcohol and acetone by the fermentation of a carbohydrate mash containing inverted molasses as the principal fermentable carbohydrate, the improvement which comprises subjecting said mash in the presence of degraded protein nitrogen to the action of a culture of bacteria of the group identifiable as *Clostridium propyl butylicum* by means of the herein described primary characteristics, at temperatures from 25° C. to 36° C., and supplying calcium carbonate to the mash to control the acidity thereof throughout the fermentation, whereby the final hydrogen ion concentration secured by the action of the bacteria fall within the range pH 5.8 to pH 6.1.

18. In a process for the production of butyl alcohol and other useful products by the fermentation of a mono-hexose mash by the action of herein-described *Clostridium propyl butylicum*-alpha, the step which comprises effecting fermentation in the presence of ammonia nitrogen, a phosphate, and an insoluble non-toxic alkaline reacting metal carbonate in a concentration slightly in excess of that required to neutralize any initial acidity of the mash.

19. In a process for the production of butyl alcohol and other useful products by the fermentation of a mono-hexose mash by the action of the herein-described *Clostridium propyl butylicum*-alpha, the step which comprises effecting fermentation in the presence of ammonia nitrogen, a phosphate, and an insoluble non-toxic alkaline reacting metal carbonate in a concentration of the order of 0.2% by weight, based on the total weight of the mesh, in excess of that required to neutralize any initial acidity of the mash.

20. In a process for the production of butyl alcohol and other useful products by the fermentation of an inverted molasses mash by the action of the herein-described *Clostridium propyl butylicum*-alpha, the step which comprises effecting fermentation in the presence of ammonium sulphate, a phosphate, and an insoluble nontoxic alkaline reacting metal carbonate in a concentration slightly in excess of that required to neutralize any initial acidity.

21. In a process for the production of butyl alcohol and other useful products by the fermentation of an inverted molasses mash by the action of the herein-described *Clostridium propyl butylicum*-alpha, the step which comprises effecting fermentation in the presence of ammonium sulphate, a phosphate, and an insoluble non-toxic alkaline reacting metal carbonate in a concentration of the order of 0.2% by weight, based on the total weight of the mash, in excess of that required to neutralize any initial acidity of the mash.

22. In a process for the production of butyl alcohol and other useful products by the fermentation of an inverted molasses mash by the action of the herein-described *Clostridium propyl butylicum*-alpha, the steps which comprise adjusting the initial hydrogen ion concentration of the mash to a pH of 5.0–6.2, and effecting fermentation at a temperature of approximately 32° C. in the presence of ammonium sulphate, a phosphate, and an insoluble non-toxic alkaline reacting metal carbonate in a concentration of the order of 0.2% by weight, based on the total weight of the mash, in excess of that required to neutralize any initial acidity of the mash.

23. In a process for the production of butyl alcohol and other useful products by the fermentation of mono-hexose mashes by the action of butyl alcohol-producing bacteria identifiable as *Clostridium propyl butylicum*-alpha by means of the herein described primary characteristics, the step which comprises effecting fermentation in the presence of ammonia nitrogen, a phosphate, and an insoluble non-toxic alkaline reacting metal carbonate in a concentration slightly in excess of that required to neutralize any initial acidity of the mash.

24. In a process for the production of butyl alcohol and other useful products by the fermentation of mono-hexose mashes by the action of butyl alcohol-producing bacteria identifiable as *Clostridium propyl butylicum*-alpha by means of the herein described primary characteristics, the step which comprises effecting fermentation in the presence of ammonia nitrogen, a phosphate, and an insoluble non-toxic alkaline reacting metal carbonate in a concentration of the order of 0.2% by weight, based on the total weight of the mash, in excess of that required to neutralize any initial acidity of the mash.

JOHN MÜLLER.